3,470,090
METHOD FOR OPERATING A NON-REGENERATIVE FIXED BED REFORMING PROCESS

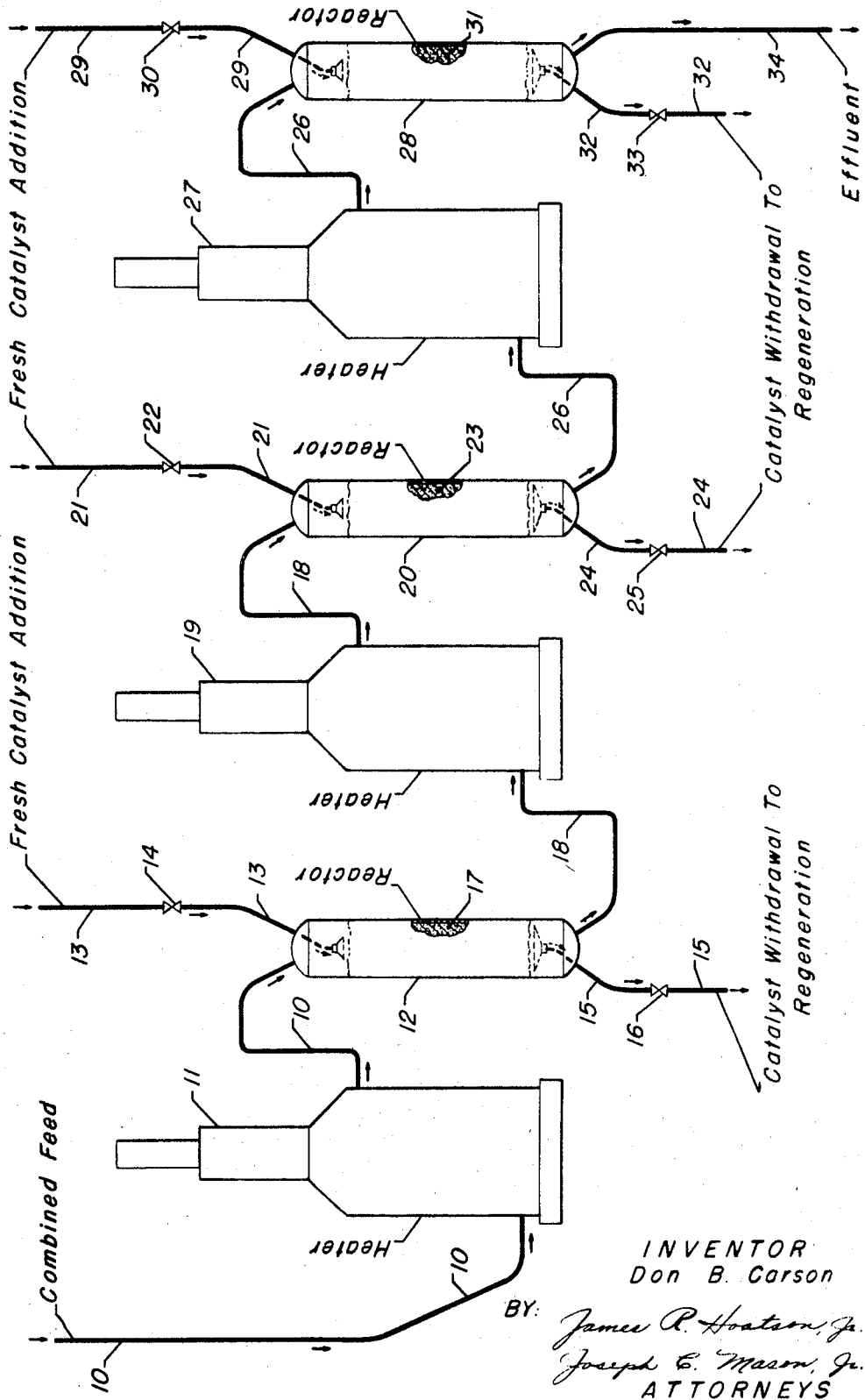

Don B. Carson, Mount Prospect, Ill., assignor to Universal Oil Products Company, Des Plaines, Ill., a corporation of Delaware
Filed Sept. 25, 1967, Ser. No. 670,827
Int. Cl. C10g *35/08*
U.S. Cl. 208—138                                5 Claims

ABSTRACT OF THE DISCLOSURE

Method for operating a non-regenerative fixed bed naphtha reforming process wherein the platinum catalyst activity is maintained at a predetermined level by periodically adding and removing catalyst from the reactors without removing any reactor from the process stream. The removed catalyst may be regenerated outside of the system and subsequently returned for reuse.

BACKGROUND OF THE INVENTION

This invention relates to a method for reforming hydrocarbons. It also relates to a method for operating a non-regenerative fixed bed naphtha reforming process. It specifically relates to a catalytic reforming process for upgrading a naphtha fraction utilizing a platinum catalyst which is maintained at a predetermined high level of activity.

The reforming of hydrocarbons, such as naphtha fractions derived from petroleum, utilizing a platinum group metal catalyst, such as platinum, is well known to those skilled in the art. Briefly, a naphtha feedstock in a gaseous state is admixed with hydrogen and contacted with platinum catalyst under reforming conditions including an elevated temperature and pressure usually in a fixed bed reaction zone to cause at least a portion of the feedstock to be converted into upgraded products. The prior art reforming processes may be divided into generally two types of operations, to wit: the non-regenerative type of operation and the regenerative type. According to the practice of the non-regenerative type of reforming process, the catalyst is utilized continuously for extended periods of time, say, from 4 to 5 months to 1 year or more depending upon the quality of the catalyst. Following this extended period of time the catalyst is regenerated or replaced by fresh catalyst while the plant is off-stream. On the other hand, according to the regenerative type of operation, the catalyst is frequently regenerated utilizing a spare or standby reactor which is periodically brought on-stream while a companion reactor is taken off-stream and regenerated.

It is evident from this brief description of the prior art process that both means of operation contain significant undesirable features to the refiner. For example, in the non-regenerative type of operation, the entire plant is usually taken off-stream while the catalyst is being regenerated or replaced thereby causing a significant loss of production. In addition, the non-regenerative type of operation requires that a refiner be satisfied with a system which has a continually declining catalyst activity profile during the processing period thereby usually requiring a significant increase in the severity of the operation to maintain product quality, generally, at the expense of product quantity.

Similarly, the regenerative type of operation utilizing the "swing reactor" procedure requires an inordinately complicated configuration of equipment having a large quantity for example, of expensive valves, lines, and equipment in order to accomplish the changing of the reactors with a minimum of lost processing time. In addition, the regenerative type of operation does have operating complexity in the procedures necessary to remove a reactor from the processing stream and the start-up of the new reactor.

Therefore, it would be desirable to provide a process which would substantially avoid the undesirable features of both types of prior art reforming processes. In other words, it would be desirable to have a reforming process which enabled catalyst activity to remain at a predetermined high level and to comprise equipment which is relatively simple and relatively inexpensive to construct and operate.

SUMMARY OF THE INVENTION

Accordingly, it is an object of this invention to provide an improved catalytic reforming process.

It is another object of this invention to provide an improved catalytic reforming process wherein the catalyst activity is maintained at a predetermined high level.

It is still another object of this invention to provide a method for operating a non-regenerative fixed bed naphtha reforming process wherein the catalyst activity is maintained at a predetermined level for extended periods of time.

Thus, in accordance with the practice of the present invention, there is provided a method of operating a non-regenerative reforming process employing a platinum group metal catalyst which comprises providing a system comprising a plurality of fixed bed reactors containing said catalyst, passing a hydrocarbon feedstock and hydrogen into said system, periodically adding fresh catalyst to at least one selected reactor and simultaneously removing used catalyst from said selected reactor while maintaining all reactors in said system, including said selected reactor, on-stream under reforming conditions, thereby substantially maintaining the catalyst activity in said system at a predetermined level.

Another embodiment of this invention includes the method hereinabove wherein said platinum group metal is platinum.

A further embodiment of the invention is the method hereinabove wherein the amount of catalyst added and removed within said selected reactor is substantially the same.

Therefore, in essence, the present invention provides a method wherein at periodic intervals, fresh catalyst is added to a reactor and used catalyst is removed therefrom in any desired amount so that the catalyst activity within such reactor is substantially maintained at its predetermined high level throughout the duration that the plant is on-stream.

The catalyst employed in the practice of the present invention comprises a platinum group metal on a suitable support, such as alumina. Preferably, the catalyst will be platinum on alumina containing from about 0.1% to 3% by weight of platinum, preferably, from 0.2% to 1% by weight platinum. The preferred support for the noble metal comprises alumina; although, other supports such as zirconia, magnesia, magnesia-alumina, etc. may also be used with satisfactory results. Those skilled in the art are familiar with the preparation of platinum group metal catalysts for reforming purposes, and since the novelty of the present invention does not reside, per se, in the catalyst, the preparation thereof will not be described herein.

The catalytic reforming conditions include a temperature from 700° F. to 1000° F., pressure from 35 to 1000 p.s.i.g., liquid hourly space velocity from 0.2 to 10, and hydrogen to hydrocarbon mol ratios from 1:1 to 10:1. As those in the art are familiar, the reforming reaction is endothermic in nature and, therefore, the reactor outlet temperatures will ordinarily be significantly less than the inlet temperatures. Therefore, the effluent from a given reactor is generally reheated to reaction temperature prior to introduction into the next succeeding reactor.

As used herein, the term "activity" with relation to the catalyst within the system of the present invention is intended to embody any definition which is representative of the ability of the catalyst to convert the hydrocarbonaceous material within the reaction zone to the desired product. For example, this term is representative of the catalysts ability to convert a product or relatively low octane number to a desired high octane number in the range, for example, from 90 to 100 octane number at a given temperature, pressure, and space velocity. Therefore, for example, a catalyst which converts a 45 octane naphtha to 96 to 100 octane numbered product is more active than one which converts the same feedstock to a product of only 90 to 92 octane number under the same operating conditions. Accordingly, those skilled in the art are generally familiar with the term "activity" of a catalytic reforming process and, therefore, more precise definition need not be presented here. The important concept embodied in the present invention, however, is that the catalyst activity in the reforming system is maintained substantially at a predetermined level by the periodic changing of the catalyst within the system while the system is on-stream.

The invention may be more fully understood with reference to the attached drawing which is a schematic representation of apparatus for practicing one embodiment of the invention. By way of emphasis, attention is directed to a previous description of the prior art regenerative system. In the prior art regenerative reforming system there is an increasing average temperature in each successive reactor. As a result, the catalyst in each succeeding reactor becomes deactivated at a faster rate than the catalyst contained in reactors upstream. In order to insure a high quality product throughout the on-stream period for the plant, the catalyst in the reactors is periodically regenerated by the procedure, for example, of blocking-out a reactor sometimes called a "swing reactor" while the remaining reactors are continued in the normal process sequence. The blocked-out reactor, for regeneration purposes, is depressured and purged with an inert gas. After purging, a flow of free oxygen containing gas is introduced and the regeneration procedure is initiated. Following regeneration, the reactor is placed on-stream by repressuring with hydrogen gas and opening the appropriate valves thereby placing the unit in the reforming cycle. Subsequently, another reactor is regenerated in substantially the same procedure.

A comparison of the "swing reactor" system is invited with reference to the appended drawing hereto.

DESCRIPTION OF THE DRAWING

Referring now to the drawing, a suitable hydrocarbon feedstock, such as a virgin naphtha having a boiling range from about 200° F. to about 360° F., and having a Research Octane Number of about 45, is introduced into the system via line 10, vaporized in heater 11 and passed into reactor 12 in admixture with hot recycle hydrogen from a source not shown. The temperature in reaction 12 may average from 900° F. to 950° F. However, since the reaction is endothermic, the effluent leaving reactor 12 via line 18 may be at a substantially lower temperature such as from 800° F. to 875° F. Reactor 12 also contains a fixed bed of platinum catalyst shown by the numeral 17. A commercial plant of the type shown may have as much as 10 to 12 tons of platinum on alumina catalyst in reactor 12. As more fully discussed hereinafter, greater amounts of catalyst may be disposed in the succeeding reactors 20 and 28 as evidenced by numerals 23 and 31, respectively.

Referring to the effluent in line 18, such effluent is heated in heater 19 and passed into reactor 20 with the subsequent effluent being removed via line 26, passed through heater 27 into reactor 28. The final effluent is removed from reactor 28 via line 34 and passed into conventional separation facilities for recovery of a high octane product, for example, a reformate having an octane number of about 95, and recovery and recycle of hydrogen gas to the reactor system.

After an extended period of time for the above described operation, there will be a decline in catalyst activity, particularly of the catalyst in reactor 28. At this predetermined point, a portion of the catalyst in reactor 28 is replaced with fresh catalyst. This may be accomplished by a variety of ways, such as a lock hopper system or a suitable screw conveyor system which would introduce fresh catalyst through valve 30 in line 29 into the top portion of catalyst bed 31. Simultaneously, a portion of used catalyst, preferably, equivalent to the amount of catalyst added is withdrawn via line 32 and valve 33 also using, for example, an appropriate lock hopper, not shown. The mechanical devices satisfactory for the introduction and removal of catalyst may contain suitable purging, pressuring, and depressuring means which those skilled in the art will be familiar with from the teachings presented herein. It is important to note, however, that the addition and simultaneous removal of catalyst from reactor 28 is accomplished without removing the reactor from the processing stream and without substantially changing the reforming conditions which are being maintained in this selected reactor.

In similar manner, the catalyst may be periodically changed in reactor 20 by adding fresh catalyst via valve 22 in line 21 with the simultaneous removal of used catalyst from line 24 and valve 25. Again, the appropriate addition and removal devices have not been shown in the drawing since such devices are within the skill of those skilled in the art. In still similar manner, the catalyst in reactor 12 may be periodically changed by adding fresh catalyst through valve 14 in line 13 while simultaneously removing used catalyst via valve 16 in line 15.

The practice of the present invention embodies the complete periodic changing of all of the catalyst in a selected reactor or, alternatively and preferably, the changing of only a portion of the catalyst contained in a selected reactor. In other words, it is preferable at any one time to change in amount of catalyst in a selected reactor which would be less than the total amount of catalyst originally present in the selected reactor. Those skilled in the art, from the teachings presented herein, may set-up a definite change cycle in order to more or less automatically maintain the catalyst activity in each of the reactors at a predetermined activity level. Thus, the catalyst may be periodically changed in whole or part in any sequence or may be changed in whole or part simultaneously in all of the reactors. It is purely the choice of the refiner what procedure would be best for his particular operation as determined by the teachings presented herein.

The catalyst which has been withdrawn from reactors 12, 20 and 28, respectively, through lines 15, 24, and 32, respectively, may be regenerated in off-site regeneration facilities for reuse within the system, if desired.

As previously mentioned, it is preferred to remove the catalyst from a selected reactor in relatively small and discrete amounts. In addition, the used catalyst may be removed from a selected reactor from a single withdrawal conduit or from a plurality of conduits connected to the lower portion of the reactor in a manner so that the catalyst can be changed over various sections of the catalyst bed in a flexible and facile manner.

PREFERRED EMBODIMENT

Therefore, from the teachings presented hereinabove, the preferred embodiment of the invention includes the method of operating a non-regenerative reforming process employing platinum on alumina catalyst which comprises providing a system comprising a plurality of fixed bed reactors containing said platinum catalyst, passing a naphtha feedstock boiling in the range from 200° F. to 360° F. and hydrogen in an amount from 4,000 to 8,000 cubic feet of hydrogen per barrel of feedstock into said system, periodically adding fresh catalyst to at least one selected reactor and simultaneously removing an identical amount of used catalyst from said selected reactor, while maintaining all reactors within the system on-stream under reforming conditions including a temperature from 700° F. to 1000° F., pressure from 35 to 1000 p.s.i.g., and liquid hourly space velocity from 0.2 to 10, thereby maintaining the catalyst activity in each reactor of said system substantially at a predetermined level.

A still further preferred embodiment of this invention is the preferred method hereinabove wherein the amount of catalyst added and removed within said selected reactor is less than the total amount of catalyst originally present in said selected reactor.

The invention claimed:
1. Method of operating a non-regenerative reforming process employing a platinum group metal catalyst which comprises providing a system comprising a plurality of fixed bed reactors containing said catalyst, passing a hydrocarbon feedstock and hydrogen into said system, periodically adding fresh catalyst to at least one selected reactor and simultaneously removing used catalyst from said selected reactor while maintaining all reactors in said system, including said selected reactor, on stream under reforming conditions, thereby substantially maintaining the catalyst activity in said system at a predetermined level.

2. Method according to claim 1 wherein said platinum group metal is platinum.

3. Method according to claim 1 wherein the amount of catalyst added and removed within said selected reactor is substantially the same.

4. Method according to claim 3 wherein said amount is less than the total amount of catalyst originally present in said selected reactor.

5. Method according to claim 2 wherein said reforming conditions include a temperature from 700° F. to 1000° F., pressure from 35 to 1000 p.s.i.g., liquid hourly space velocity from 0.2 to 10, and hydrogen to hydrocarbon mol ratio from 1:1 to 10:1.

References Cited

UNITED STATES PATENTS

| | | | |
|---|---|---|---|
| 2,854,400 | 9/1958 | Weisz | 208—140 |
| 3,011,965 | 12/1961 | Decker | 208—140 |
| 3,255,103 | 6/1966 | Fahnestock | 208—120 |

HERBERT LEVINE, Primary Examiner

U.S. Cl. X.R.

208—152, 176